United States Patent [19]
Fuhrer

[11] 3,967,311
[45] June 29, 1976

[54] VELOCITY CORRECTION FOR VIDEO DISCS

[75] Inventor: Jack Selig Fuhrer, Princeton Junction, N.J.

[73] Assignee: RCA Corporation, New York, N.Y.

[22] Filed: Nov. 12, 1974

[21] Appl. No.: 522,819

[52] U.S. Cl. .................................. 358/8; 178/6.6 P
[51] Int. Cl.² ....................... H04N 5/76; H04N 5/80
[58] Field of Search ............... 358/8, 4; 360/36, 70; 178/6.6 TC, 6.6 P, 6.6 DD; 179/100.4 E, 100.4 D

[56] References Cited
UNITED STATES PATENTS
3,871,020  3/1975  Wilber .................................. 358/8

FOREIGN PATENTS OR APPLICATIONS
293,608  9/1965  Australia ............................... 358/4

Primary Examiner—Robert L. Griffin
Assistant Examiner—R. John Godfrey
Attorney, Agent, or Firm—Eugene M. Whitacre; Stephen Siegel; William H. Meagher

[57] ABSTRACT

In a video disc player, apparatus for generating phase error signals between a reference signal recorded on a video disc record and an external reference are utilized to correct both velocity errors in the recorded signal information and phase errors in the recorded reference signal.

9 Claims, 1 Drawing Figure

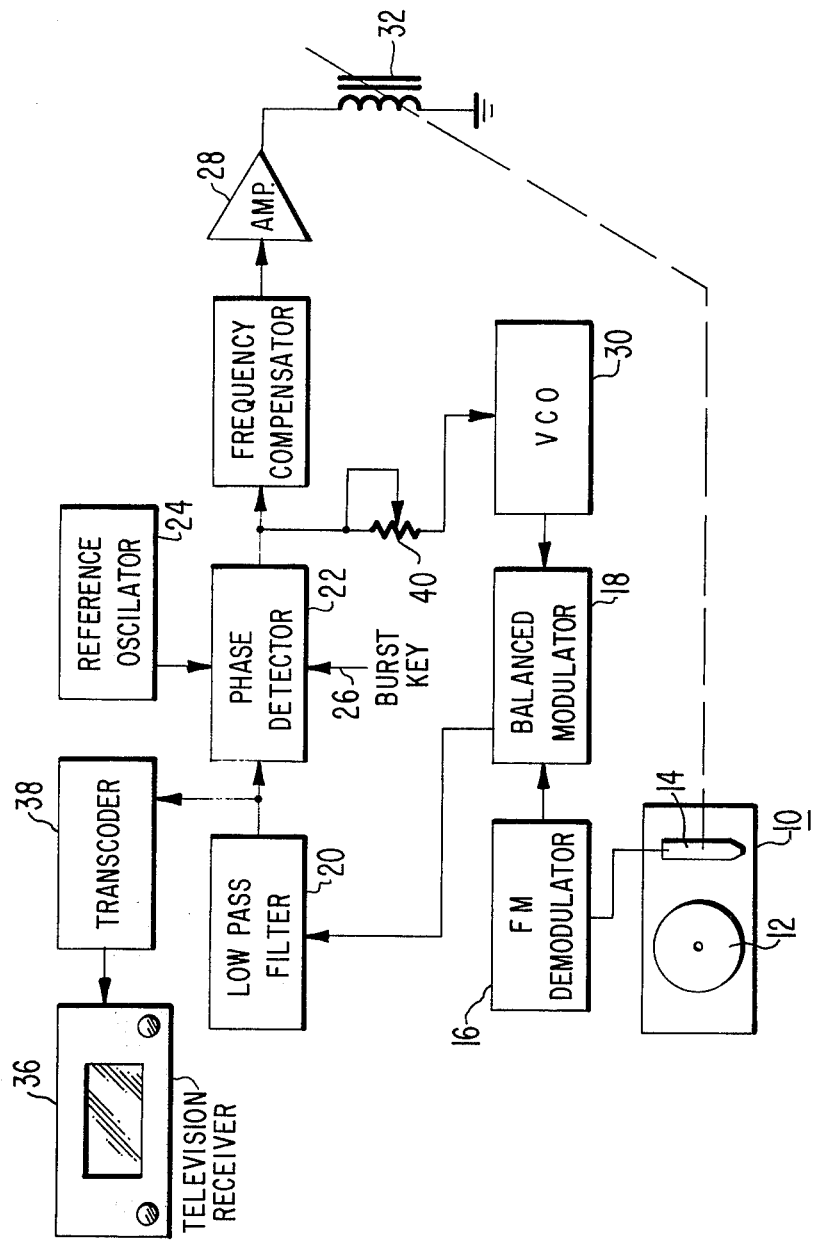

VELOCITY CORRECTION FOR VIDEO DISCS

This application is concerned with a video disc player apparatus and more particularly, to circuitry utilized to correct relative velocity errors in information retrieved from a rotating video disc.

In one type of video disc reproducing system, capacitance variations measured between a signal pickup stylus and video disc record is sensed to reconstruct the information embossed within a spiral groove on the record. In this type of video disc system, composite video signals including time varying image components and regularly recurring synchronization components are recorded in the form of geometric variations in the spiral groove on the surface of the record. The disc surface may include a conductive material covered with a thin coating of dielectric material. A metal electrode associated with the stylus playback device cooperates with the conductive material and dielectric coating to form a capacitor. Capacitance variations due to the signal representative geometrical variations in the spiral groove are sensed and decoded to provide a video representative output signal. A detailed description of a capacitive video disc system is described in U.S. Pat. No. 3,842,194, in the name of Jon K. Clemens and entitled, INFORMATION RECORDS AND RECORDING PLAYBACK SYSTEMS THEREFORE.

In order to accurately reconstruct the signal information received from the video disc into a relatively jitter-free color image, it is desirable to compensate for all velocity and phase errors in the derived video information. Composite video signals that are derived from the rotating video disc may be subject to velocity errors that are due, for example, to disc warpage or eccentricity of the information storing spiral groove with respect to the center hole in the disc. As a result of eccentricity or disc warpage, a signal sensed by an associated signal pickup arm may be received at alternately faster and slower speeds than that at which it was recorded. One scheme that may be utilized to compensate for such alternating velocity errors incorporates an electromechanical device for repositioning the signal pickup stylus in response to velocity errors. An electromechanical device of this type, referred to as an arm stretcher, may include a transducer that is mechanically coupled to the signal pickup stylus. Upon application of appropriate electrical signals to this transducer, the pickup stylus may be caused to traverse along the spiral groove in consonance with the velocity errors. A typical arm stretcher is described in U.S. Pat. No. 3,711,641, in the name of Richard C. Palmer assigned to RCA Corporation.

In previous video disc player systems, the arm stretcher apparatus was controlled by timing signals such as vertical or horizontal sync pulses. The use of sync pulse signals, however, requires separate and additional circuitry for providing such signals with relatively stable leading edges. Further, in the use of such synchronizing signals, relatively elaborate circuitry is desirably utilized to minimize the probability of erroneous signals caused by noise impulses.

In accordance with the present invention, simplified circuitry may be utilized for controlling an arm stretcher while concurrently correcting phase errors in the received chrominance subcarrier signal. This apparatus comprises means that are coupled to the signal pickup stylus for decoding composite video signals provided from a rotating video disc. A heterodyning means receptive to the decoded signals, heterodynes these signals with signals from a voltage controlled oscillator to produce frequency translated composite video signals. A reference oscillator provides signals at substantially the same frequency as the chrominance burst component in the translated signal. Means that are receptive to signals from the heterodyning means and from the reference oscillator provide signals that represent the phase difference between the two received signals. The difference signal produced by this latter means is coupled to the voltage controlled oscillator and controls the frequency thereof to provide a relatively stable translated chroma subcarrier frequency signal. A transducer means is coupled to the pickup stylus for repositioning the stylus along the groove of the record in response to the difference signals.

A better understanding of the invention may be derived from the following detailed description when taken in connection with the accompanying drawing of which:

FIG. 1 is a block diagram of circuitry suitable for providing phase locking of the chrominance subcarrier signal and controlling an arm stretcher transducer.

With reference to the drawing, a video disc player 10 has a video disc 12 located thereon. A signal pickup arm 14, associated with the video disc player, has a signal pickup stylus located therein, not shown in the drawing. Signals derived from pickup arm 14 are coupled to an FM demodulator 16. Demodulator 16 provides signals to a balanced modulator 18. Modulator 18 has an output terminal coupled to a low-pass filter 20. Signals provided by filter 20 are coupled to a phase detector 22. Phase detector 22 receives signals from a reference oscillator 24 and from a burst key input line 26. Signals provided by detector 22 are coupled to an amplifier 28 and a voltage controlled crystal oscillator 30. Oscillator 30 provides signals to modulator 18. Detector 22 further provides signals to an electromechanical arm stretcher transducer 32 through a frequency compensating network 34 and an amplifier 28. Transducer 32 is mechanically coupled to a signal pickup stylus located in pickup arm 14. Frequency translated signals at the output of filter 20 are coupled through a transcoder 38 to television receiver 36 where they may be displayed.

In the operation of the above-described circuitry, the video disc 12 is rotated on a turntable associated with player 10. For purposes of illustration, it may be assumed that the center hole of the disc is not centered with respect to the spiral groove information recorded thereon. Hence, signal information derived from the disc is subject to changes in velocity as the disc rotates. A signal pickup stylus located within signal pickup arm 14 detects the capacitance variations associated with the recorded topography in the spiral groove of the disc and couples this capacitive variation to circuitry not shown within arm 14. The circuitry within arm 14 converts the capacitive variations into electrical signals which are then coupled to an FM demodulator 16. Demodulator 16 decodes the FM signals provided from arm 14 into the recorded composite video signals. Composite color video signals recorded on the video disc may be in a buried subcarrier format. A buried subcarrier signal illustratively includes a broad band luminance signal component of about 3 MHz bandwidth and an interleaved narrow band chrominance signal component. The chrominance signal component may be in the form of ½ MHz sidebands of a 1.53 MHz subcarrier substantially located in the midband of the broad band luminance component. A chrominance reference burst signal may further be incorporated during the back porch interval of the horizontal synchronization signals.

The signals provided from demodulator 16 are coupled to a balanced modulator 18. Modulator 18 may be of a singly balanced type for which the input portion is balanced. By utilizing a balanced type of modulator, the baseband video modulating component may be substantially eliminated from the modulator output signal. The elimination of the baseband signal is desirable for providing simplified filtering at the output of the modulator in order to recover substantially only the frequency translated video signal. Video signals applied to modulator 18 are translated in frequency by signals provided by a voltage controlled crystal oscillator (VCXO) 30. Oscillator 30 provides signals that are substantially at 5.11 MHz. Upon heterodyning the signals from oscillator 30 with the video signal provided by demodulator 16, a frequency translated video signal is produced having upper and lower sideband components on each side of 5.11 MHz. The chrominance subcarrier signal, which was at 1.53 MHz in the signal provided from demodulator 16, is translated to 3.58 MHz in the lower sideband component of the frequency translated video signal. A low-pass filter 20, having a bandpass of about 8 MHz, passes substantially only the first modulation product of modulator 18, i.e., the sidebands on each side of a carrier at about 5.11 MHz.

Frequency translated signals provided at the output of filter 20 are coupled to a phase detector 22. Phase detector 22 gates the video signal received from low-pass filter 20 in response to burst key signals applied at terminal 26. Burst key signals follow the horizontal synchronization signals which have been decoded by circuitry not shown. The gated video signals within phase detector 22 are compared to signals from reference oscillator 24. Reference oscillator 24 is a relatively stable oscillator which provides signals at 3.58 MHz. This oscillator is preferably of the crystal controlled variety. A resultant difference signal between the phase of the signals supplied by oscillator 24 and the chroma reference burst signal in the lower sideband of the frequency translated video signal is provided at the output of detector 22 and coupled to the frequency control input of VCXO 30. Oscillator 30 varies in frequency in accordance with the applied difference signal and operates to minimize this difference signal by varying the frequency about which the composite video signal is translated. Hence, the frequency of VCXO 30 is caused to jitter by the applied difference signal in consonance with the jitter of the signal received from disc 12. The resulting frequency translated video signal at the output of modulator 18 therefore has a stabilized chrominance subcarrier component that is phase locked with reference oscillator 24.

Stabilization of the chrominance subcarrier signal is necessary for producing accurate color reproduction of image produced from the video disc information. However, stabilization of only the chrominance subcarrier signal is inadequate for minimizing the gross timing errors produced by video disc warpage or eccentricity. To minimize such timing errors, an arm stretcher transducer, capable of continuously repositioning the signal pickup stylus along the groove of the video disc, may be utilized. Signals utilized to control the arm stretcher transducer may be derived from the phase difference signals produced by detector 22. Phase difference signals are particularly well suited for controlling an arm stretcher transducer since these sgnals may be produced with a relatively high degree of noise immunity and accuracy. The presence of several cycles of color burst reference signal information recurring about 2000 times each disc revolution enable the formation of a phase difference signal capable of accurately following the timing errors of the rotating video disc.

With reference to the drawing, an arm stretcher transducer 32 is controlled by signals derived from phase detector 22. Transducer 32, as described in the aforementioned patent in the name of Palmer, may be formed in a similar manner to a relatively small loudspeaker. For example, the cone of the loudspeaker may be mechanically coupled to the signal pickup stylus and the electromagnetic field of the speaker coupled to the source of phase difference signals.

A frequency compensating network 34 receives signals from detector 22 and operates as a lead-lag network to minimize signal phase shift to transducer 32. Signals that have been phase compensated by network 34 are coupled to transducer 32 through an amplifier 28. Amplifier 28 provides signals at a relatively low impedance level for driving transducer 32. By applying appropriate signals to the coil of the transducer, the signal pickup stylus may be caused to traverse along the spiral groove in the video disc. Signal amplitudes applied to transducer 32 and VCXO 30 are desirably adjusted in the following manner. First, the signal gain of amplifier 28 is adjusted to provide a maximum amount of jitter correction in the displayed image. After the picture jitter has been reduced to a subjectively acceptable level, signal gain to VCXO 30 is adjusted. Gain control 40 is rotated to provide a maximum amount of signal gain to VCXO 30 without detrimentally affecting the jitter stabilization of the displayed image. Too much signal gain to VCXO 30 reduces the amount of correction signal to transducer 32. Too little signal gain to VCXO 30 may detrimentally affect the stability of the chrominance subcarrier signal and therefore effect the chrominance of the displayed image. By properly adjusting the signal gains to both transducer 32 and VCXO 30, a displayed image may be produced with subjectively acceptable color and minimum jitter. A detailed description of circuitry suitable for coupling a desired amount of signal gain to transducer 32 and VCXO 30 is given in a co-filed U.S. patent application in the name of Thomas Burrus, Ser. No. 522,816, assigned to RCA Corporation.

Operation of the arm stretcher transducer from phase difference signals utilized by the phase-locked loop allows a reduction in otherwise duplicated circuitry and further provides transducer control signals which are relatively noise free and of a high degree of accuracy. Hence, an improved arm stretcher control signal is provided by utilizing the phase difference signal developed by circuitry for phase stabilizing the chrominance subcarrier burst component in the composite video signal extracted from the video disc.

What is claimed is:

1. In a video disc player in which a signal pickup stylus cooperates with a signal information storing groove of a video disc, said information storing groove including recorded luminance, chrominance and color synchronization signal components, and said signal components as recovered by said pickup stylus being subject to recurring frequency and phase errors as a consequence of errors in velocity of relative motion between said disc groove and said pickup stylus, apparatus for providing correction of said signal component errors comprising:
  means coupled to said signal pickup stylus for decoding signals provided from said video disc;
  a voltage controlled oscillator;
  heterodyning means receptive to signals from said decoding means and said voltage controlled oscillator for frequency translating the constituent components of said decoded signal;
  a reference oscillator for providing signals at a reference frequency;
  means receptive to signals from said heterodyning means and said reference oscillator for providing an error signal indicative of departures, if any, of a color synchronization component in the frequency translated output of said heterodyning means from correspondence in frequency with said reference frequency;
  means for rendering said voltage controlled oscillator responsive to said error signal to control the frequency thereof in a manner opposing said departures from said frequency correspondence; and
  transducer means coupled to said pickup stylus for repositioning said stylus along the groove of said video disc records in response to said error signal in a manner opposing said errors in velocity of relative motion.

2. Apparatus according to claim 1 wherein: said receptive means is a phase detector having input terminals for receiving signals from said reference oscillator and said heterodyning means, and an output terminal for providing signals proportional to the phase difference between said reference signals and a color synchronization component in the frequency translated signal provided by said heterodyning means.

3. Apparatus according to claim 2 wherein:
said reference oscillator provides output signals at substantially 3.58 MHz and said color synchronization component in said frequency translated signal is also at substantially 3.58 MHz.

4. Apparatus according to claim 3 wherein:
said heterodyning means has a balanced input terminal for receiving video signals and an output terminal for providing frequency translated signals substantially free of baseband video signals.

5. Apparatus according to claim 4 wherein:
said means coupled to said pickup stylus includes apparatus for decoding capacitive variations sensed by said pickup stylus into electrical signals representative of the information recorded on said video disc.

6. Apparatus according to claim 5 wherein said voltage controlled oscillator is a voltage controlled crystal oscillator having an output frequency of about 5.11 MHz.

7. In a video disc player including a signal pickup stylus for recovering signals from a rotating video disc, said player being subject to recurring errors in the velocity of relative motion between said disc and said stylus; apparatus comprising:
  a source of oscillations;
  heterodyning means coupled to said stylus and responsive to oscillations from said source for frequency translating signals recovered by said stylus;
  a source of reference signals;
  a phase comparator receptive to said reference signals and frequency translated signals from said heterodyning means for developing an output indicative of departures, if any, from frequency correspondence between the frequency of said reference signals and the frequency of a periodically recurring component of said frequency translated signals;
  an armstretcher transducer coupled to said signal pickup stylus;
  means coupling said phase comparator to said transducer for repositioning said stylus in response to said output of said phase comparator in a sense opposing said errors in said velocity of relative motion; and
  further means coupling said phase comparator to said source of oscillations for controlling the frequency of said oscillations, in accordance with said output of said phase comparator, in a sense tending to maintain frequency and phase synchronism between said periodically recurring component of said frequency translated signals and said reference signals.

8. Apparatus according to claim 7 wherein:
said signals recorded on the video disc include varying video components and a regularly recurring color synchronization component; and
said periodically recurring component of said frequency translated signals corresponds to a product of the heterodyning of said regularly recurring color synchronization component with oscillations from said source by said heterodyning means.

9. Apparatus according to claim 8 wherein:
said source of oscillations includes a voltage controlled oscillator receptive to said output of said phase comparator and having an output frequency of about 5.11 MHz.

* * * * *